United States Patent [19]
Hana et al.

[11] Patent Number: 5,644,302
[45] Date of Patent: Jul. 1, 1997

[54] DEVICE FOR REMOTELY CHANGING THE SET TEMPERATURE OF A THERMOSTAT

[75] Inventors: Najib Hana, 3 Buckboard Dr., Cumberland, R.I. 02864; Musa Jouaneh, Kingston, R.I.

[73] Assignee: Najib Hana, Cumberland, R.I.

[21] Appl. No.: 364,614

[22] Filed: Dec. 27, 1994

[51] Int. Cl.$^6$ .................................................. H04Q 1/00
[52] U.S. Cl. ..................... 340/825.06; 340/825.69; 340/825.72; 236/51
[58] Field of Search ............... 340/825.06; 236/49.1, 236/51, 49.3

[56] References Cited

U.S. PATENT DOCUMENTS

| | | | |
|---|---|---|---|
| 4,453,485 | 6/1984 | Houghton-Brown et al. | 114/144 |
| 4,646,964 | 3/1987 | Parker et al. | 236/49.3 |
| 4,860,950 | 8/1989 | Reeser et al. | 236/51 |
| 5,114,070 | 5/1992 | Lilja et al. | 236/49.3 |

OTHER PUBLICATIONS

Technics AM/FM Sterio Receive SA-R230 Operating Instructions Manual, 1988, pp. 5, 9, 12 and 13.

*Primary Examiner*—Edwin C. Holloway, III
*Attorney, Agent, or Firm*—Samuels, Gauthier, Stevens & Reppert

[57] ABSTRACT

A remote control system for a rotatable thermostat. The protective cover of a state-of-the-art thermostat is removed and a device responsive to remote control signals is substituted therefor. A drive wheel engages the thermostat dial and a control circuit determines the direction of rotation of the drive wheel. The thermostat dial is rotated in increments of 1° F. A rod engages the drive wheel and extends through the housing of the device such that the drive wheel may be accessed without removing the device. When it is desired to manually rotate the thermostat, the rod disengages the drive wheel from the thermostat dial.

9 Claims, 6 Drawing Sheets

DEVICE FOR REMOTELY CHANGING THE SET TEMPERATURE OF A THERMOSTAT

FIELD OF THE INVENTION

The invention relates to a remote control device for a thermostat.

BACKGROUND AND BRIEF SUMMARY OF THE INVENTION

In practice today, particularly in the home, there are many applications and uses for remote control devices. The most common being remote control of television, video, cable, garage door openers, sound systems, etc.

Another device in the home which can also be remotely controlled is a thermostat. Most remote control automatic thermostat systems are 'computer' controlled. The temperature in a zone(s) can be controlled based on the day, the temperature setting, the duration of time at a temperature setting and changing the temperature setting and its duration.

The present invention embodies a device adapted to engage prior art thermostat dials. The device is remotely controlled and rotates the thermostat dial either clockwise or counterclockwise The invention further comprises a remote control device which indicates the current temperature setting of any of the zones in a particular dwelling and enables the user to remotely control the individual thermostat settings to a desired temperature.

Broadly, the invention comprises a device which engages the dial of a prior art thermostat. The device is adapted to index remotely the dial, clockwise or counter-clockwise, any desired amount (within the range of thermostat) and to display what the temperature setting is to the user. Assuming a dwelling with three zones, a remote control device of the invention allows the user to press zone 1, zone 2 or zone 3 to emit a display indicating the current setting of the thermostat for that zone. The user may then remotely adjust the temperature setting in each of the zones as desired.

DESCRIPTION OF THE PREFERRED EMBODIMENTS

Figure 1:
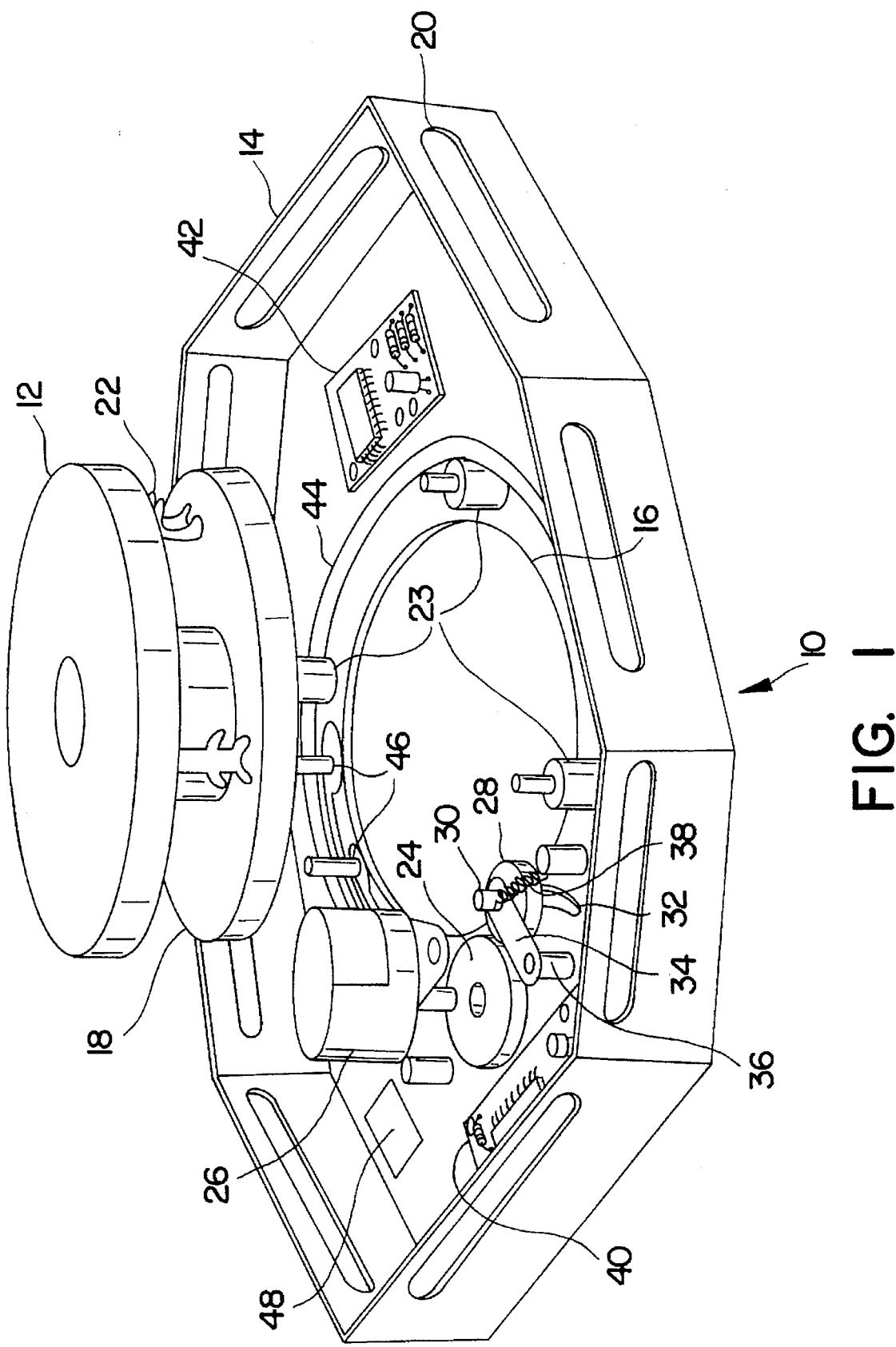
FIG. 1 is an exploded perspective view of a prior art thermostat dial and a device embodying the invention.
Figure 2:
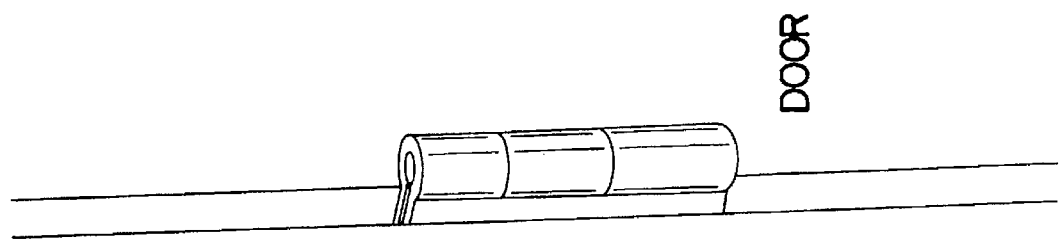
FIG. 2 is a front perspective view of a device of FIG. 1.
Figure 2:
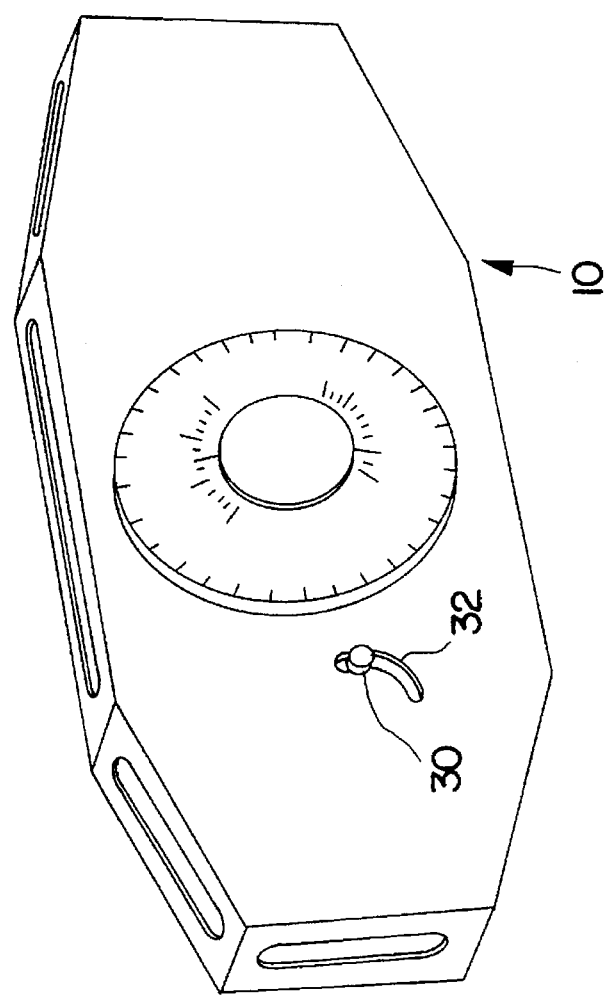

Referring to FIGS. 1 and 2, a device 10 is shown for remotely changing the set-temperature of a standard commercially available round-dial thermostat 12. The housing 14 of the device 10 is symmetric in shape and has a round hole 16 whose size is made to match the dial diameter of the prior art thermostat 12. In this preferred embodiment, the housing 14 of the device 10 is shown to have an octagonal shape but it could also be round, rectangular etc. The body 14 has a number of apertures 20 on its side to allow for circulation of room air to the thermostat sensing elements.

Attached to the body of the device 10 are three feet 23 designed to sit in the three prior art spring holders 22 (only two shown in FIG. 1) of the round-dial thermostat 12. The feet 23 are designed to provide easy assembly of the device 10 into the prior art thermostat base.

A friction wheel 24 is driven by a stepper motor 26. The friction wheel 24 engages and drives the dial 18 of the thermostat via a friction wheel 28. The wheel 28 is rotatably supported on a shaft 30 that extends on one side through a groove 32 in the body of the device 10 (FIG. 2) to be accessible on the outside of the device 10. The other side of the shaft 30 rotatably passes through a link 34 which link is pivotally secured to a support shaft 36. The assembly consisting of a wheel 28 and the shaft 30 is loaded by a spring 38 to provide a preload to friction wheel 24 and the thermostat dial 18. That is, the spring 38 biases the shaft 30 to ensure the friction wheel 28 normally engages the friction wheel 24 and the thermostat dial 18. When the shaft 30 is moved in the groove 32 in a direction away from the friction wheel 24, the wheel 28 is disengaged from the thermostat dial 18, allowing easy manual rotation of the dial.

Figure 3:
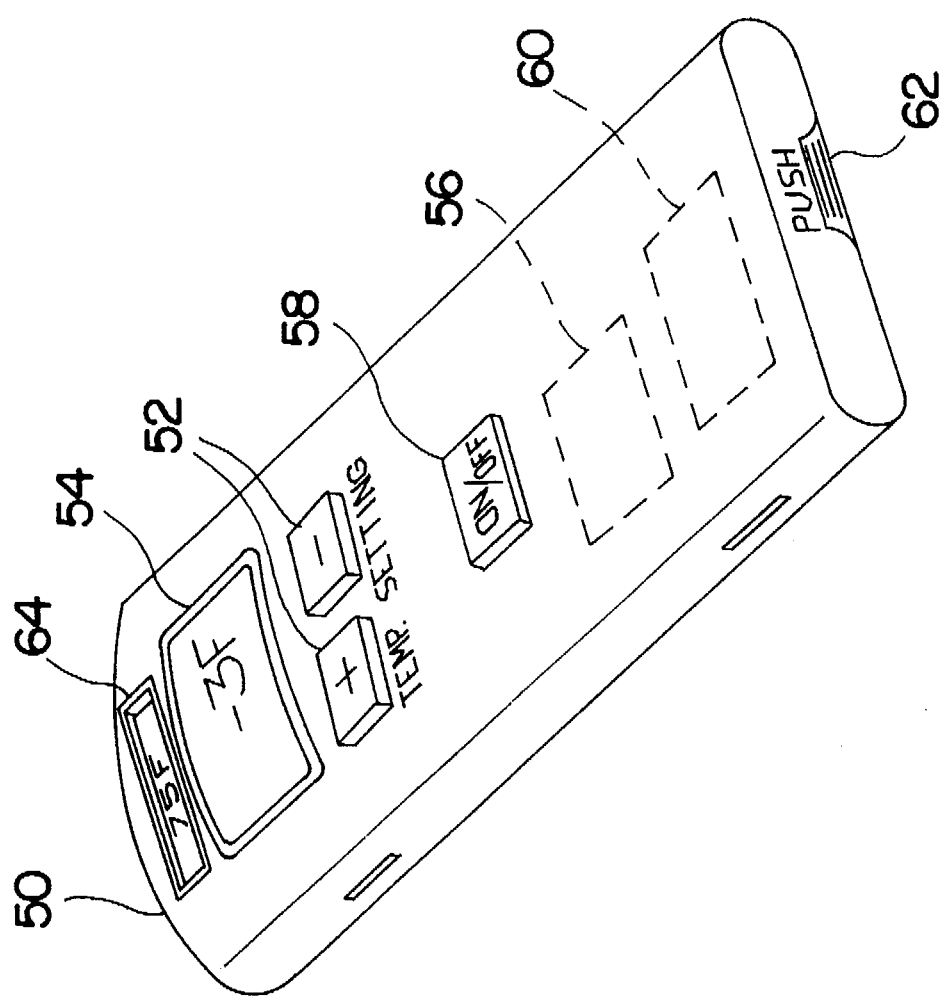
FIG. 3 is a top perspective view of a remote control device of the invention.

The stepper motor 26 is controlled through a circuit 40 that sends the necessary direction and pulse signals to the motor corresponding to the commands sent by the user from a remote wireless control unit 50, shown in FIG. 3, through a receiver circuit 42 mounted on the body 14. An antenna 44, connected to the receiver circuit 42, can be added to improve reception of the control signals if the receiver circuit 42 does not have a built-in antenna. These electronic control components are well known in the art and need not be described in detail.

The device 10 is powered from the heating/cooling equipment power supply leads that are connected to the thermostat and from a rechargeable battery 49 placed on the device. Leads 46 on the device draw power to a circuit 48 that rectifies the AC input voltage and converts it into a DC voltage. When the thermostat circuit is open (i.e., the heating or cooling equipment is off), this DC voltage is used to power the receiver circuit 42 and the stepper motor control circuit 40 on the device, and to recharge the battery 49. When the thermostat circuit is closed, a relay (not shown) causes the receiver circuit 42 and the stepper motor control circuit 40 to be powered from the rechargeable battery 49.

The device 10 is controlled by a wireless radio frequency remote-control unit 50 shown in FIG. 3. The control unit has buttons 52 to increase or decrease the set temperature of the thermostat. The remote control unit has a small screen 54 that can be made to either display the change in set temperature of the thermostat or the current temperature setting of the thermostat. For displaying the current temperature setting, the change in set temperature value is electronically added to a base temperature (70° F. for example, which corresponds to the thermostat dial setting when the device 10 was first installed), and the result is displayed. The control signals are transmitted to the device by a transmitter circuit 56 inside the remote-control unit. The remote-control unit can be designed to control a single device 10 or multiple devices 10. For controlling a single device 10, the remote control unit 50 has an on/off switch 58. Commands can be transmitted to the device 10 only if the switch is in the on position. When the switch is in the off-position, it prevents accidental transmission of commands to the device 10. The remote-control unit 50 is powered by a battery 60. The battery can be replaced by sliding the battery cover 62. The control unit 50 also has a LED display 64 to display the room temperature.

The remote-control unit 50 is analogous to commercially available radio frequency remote-control units and per se is well within the skill of the art. Rotation of the dial in a clockwise direction (temperature increase) or counterclockwise (temperature decrease) is determined by the setting of one of the four most significant bits in the 12-bit data packet transmitted to the receiver. Upon decoding of the data by the receiver control circuit, the direction command for the stepper motor control circuit is appropriately set based on the value of that transmitted bit.

Figure 5:
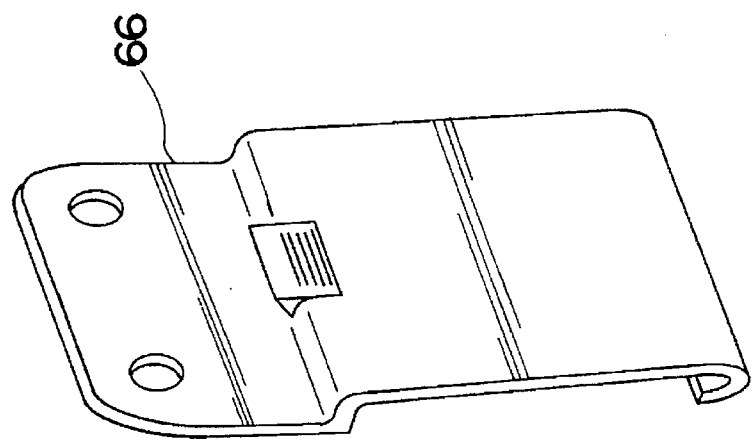
FIG. 5 is a perspective view of a holder for the device of FIGS. 3 and 4.
Figure 4:
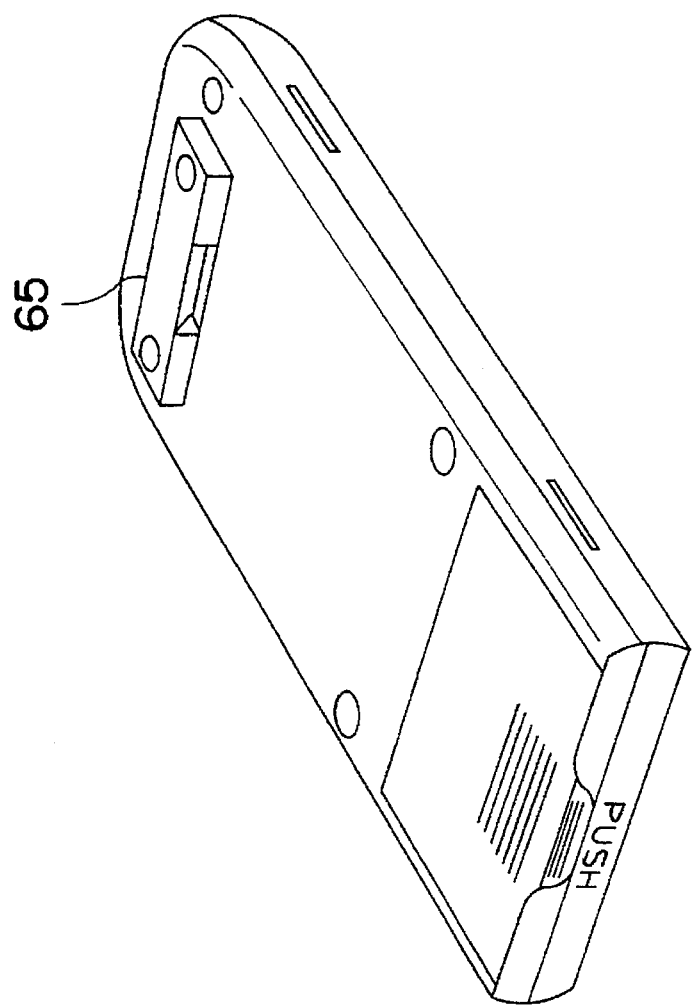
FIG. 4 is a back perspective view of the device of FIG. 3.

The back of the remote-control unit 50 is provided with a step 65 (see FIG. 4) to allow the unit to be attached to a holder 66 (see FIG. 5) that can be permanently attached to a wall. The step 28 allows easy detachment of the remote-control unit from the holder 66.

Figure 6:
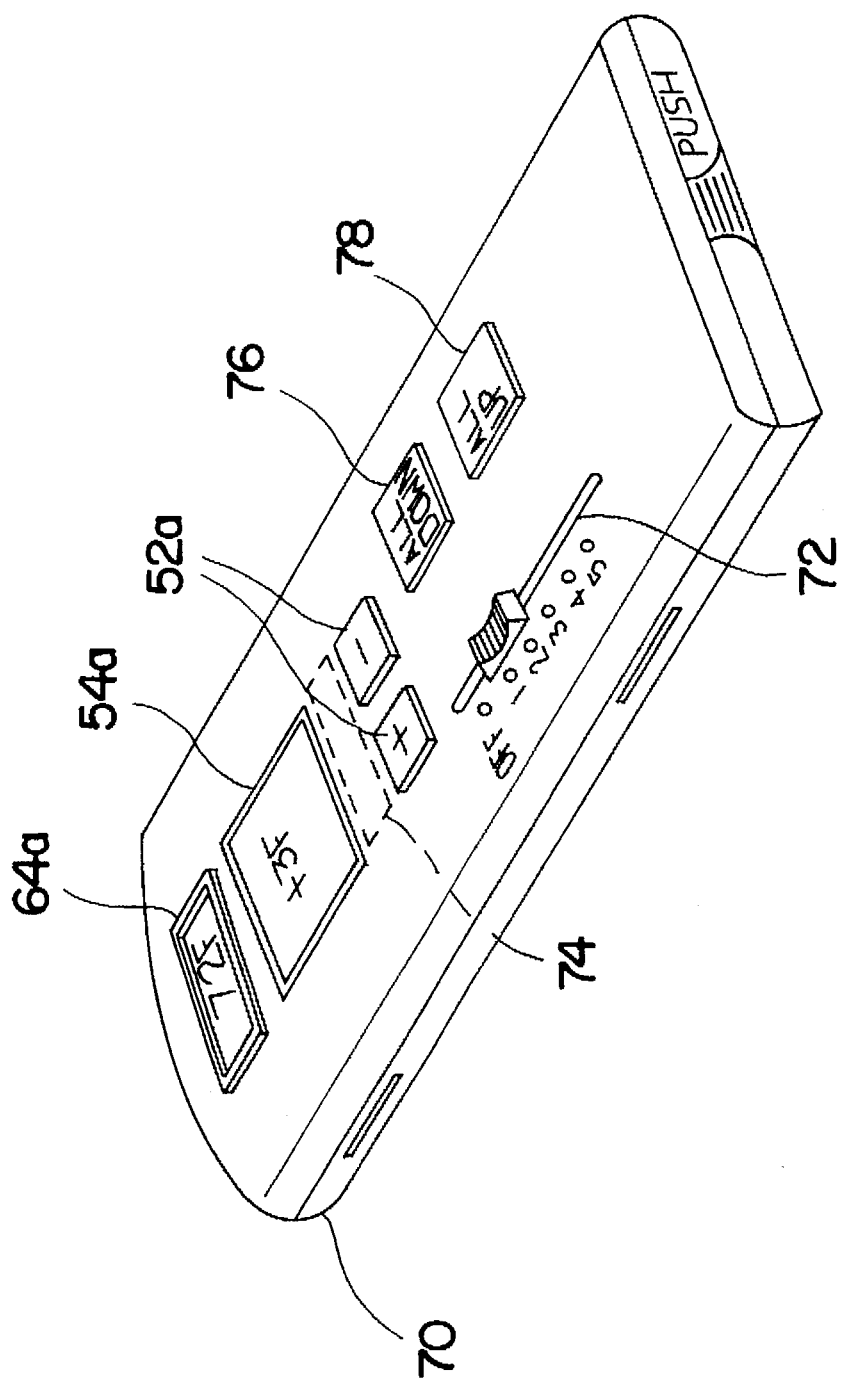
FIG. 6 is a perspective view of a remote control device of an alternative embodiment of the invention.

For controlling multiple devices 10, a remote control unit 70 (see FIG. 6) has a slider 72 to select the particular device 10 that needs to be controlled. Selection of the particular device is accomplished using the lower 8-bits of the 12-bits data packet as an identifying code for the receiver located in a particular zone. In this case, when the control buttons 52a are pressed, control signals will be sent to the selected device. A circuit 74 is provided to store the last change in set temperature for all of the devices. The change in set temperature or the current temperature setting for any zone will be shown in the display screen 64a when the slider switch 72 is moved to the position corresponding to that zone. The "Off" position on the slider switch 74 has a similar function to that in the remote-control unit for a single device. An "All Down" button 76 is provided on the control unit. Pressing this button will transmit control signals to all the devices controlled by the remote-control unit to decrease the set-temperature of all the thermostats by a specified value (5 degrees for example). An "All Up" button 78 has a similar function, except the set-temperature of all the thermostats will be increased by a specified value. Other features on the control unit for multiple devices are similar to those in the control unit for a single device.

Figure 7:
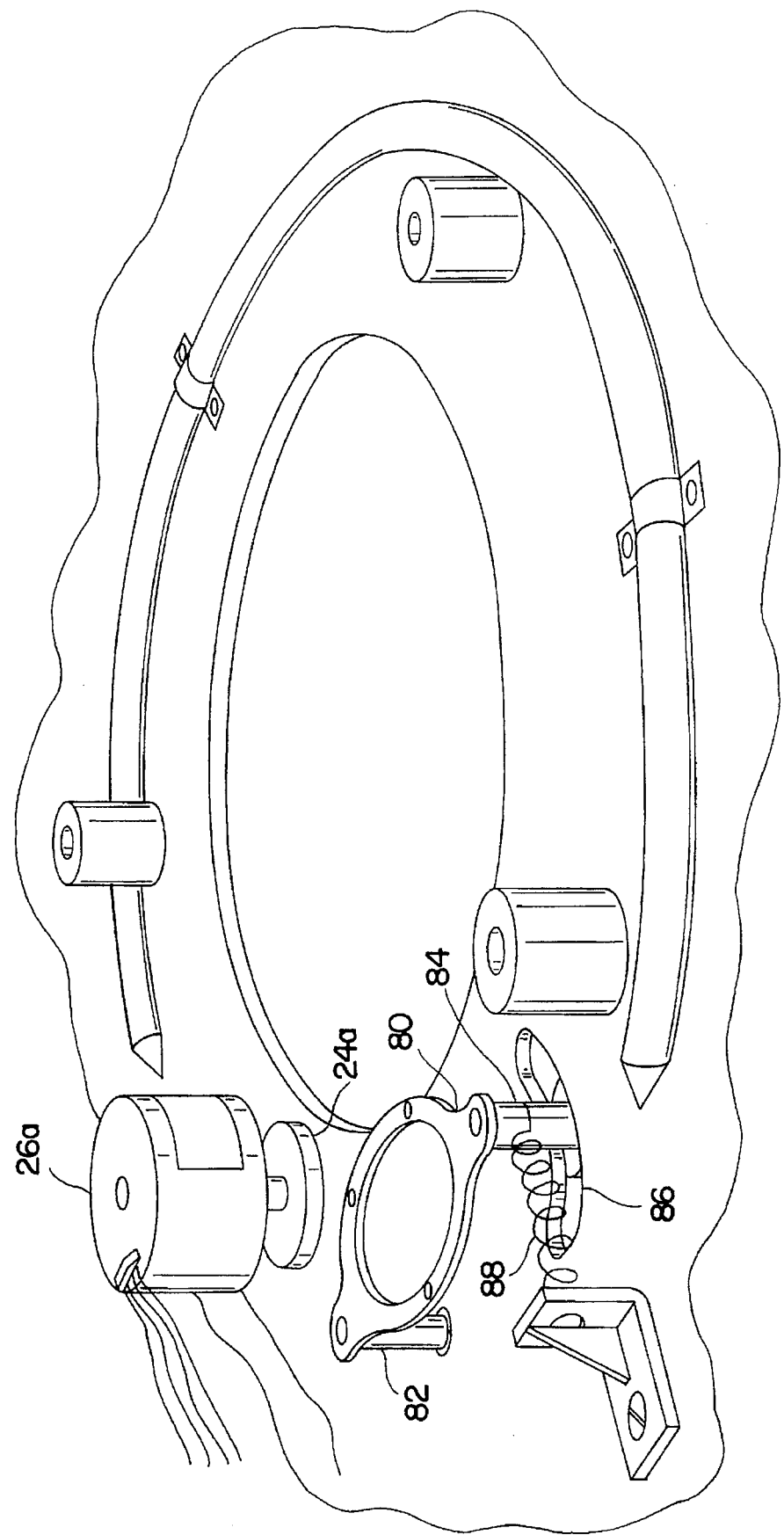
FIG. 7 is a perspective view of an indexing mechanisms of an alternative embodiment of the invention.

In another embodiment of the device (see FIG. 7), the friction wheel 24a on the stepper motor 26a shaft directly drives the thermostat dial (not shown) without an intermediate wheel. The stepper motor 26a is supported by a ring 80 whose one end is attached to a fixed support point 82 and the other end to shaft 84 that extends through a groove 86 in the body of the device to be accessible on the other side of the device. The assembly made up of the ring 80 is loaded by a spring 88 to provide a preload to the thermostat dial. When shaft 84 is moved in groove 86 in a direction toward spring 88, the wheel 24a on the stepper motor is disengaged from the thermostat dial 17, allowing easy manual rotation of the dial.

In another embodiment of the device, the device can be controlled by a remote wire-connected control unit. The control unit in this case will be permanently attached to a wall and there will be two wires directly connected between the control unit and each device's stepper motor control circuit. Similar to the wireless control-units, the control units in this case can be made to control single or multiple devices. The control unit and the device will be similar in function the wireless version of the device, but the transmitter circuit in the remote control unit and the receiver in the device will no longer be needed.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A remote control system for a thermostat having a rotatable dial which dial controls the temperature settings which comprises:

a housing joined to the thermostat;

a control circuit within the housing to receive an input signal from a remote control device and to output a signal;

drive means secured within the housing and in electrical communication with the control circuit, the drive means comprising a stepping motor and a first friction drive wheel which engages and rotates the thermostat dial a predetermined amount when a signal is received by the control circuit, the first friction drive wheel being biased into contacting engagement with the thermostat dial; and means engaged to the first friction drive wheel within the housing and extending exteriorly of the housing to disengage the drive wheel from the thermostat dial whereby the thermostat dial may be manually rotated.

2. The system of claim 1 which comprises:

a second friction drive wheel interposed between the stepping motor and the first drive wheel and which second friction drive wheel is driven by the stepping motor and which second friction drive wheel in turn drives the first drive wheel.

3. The system of claim 1 wherein the control circuit comprises:

a receiver circuit and a drive circuit, the receiver circuit adapted to receive the signal from the remote control device and to provide an output signal to the drive circuit which output signal drive circuit converts to a pulse and direction signals to drive the stepper motor.

4. The system of claim 1 wherein each pulse received from the remote control device rotates the dial 1° F.

5. The system of claim 1 which comprises:

means to derive power for the circuit control means from a rechargeable battery and from the power supply leads that are connected to the thermostat and provide AC voltage; and means to rectify that AC voltage and convert the same into DC voltage.

6. The system of claim 1 which comprises:

an antenna adapted to receive the signal from the remote control device and to transmit the same to the control circuit.

7. The system of claim 1 wherein the remote control device comprises:

means to display the current temperature setting of the thermostat.

8. The system of claim 7 wherein the remote-control device comprises:

means to output a digital code to the control circuit which results in the control circuit driving the thermostat dial in a clockwise direction; and means to output a different digital code to the control circuit which results in the thermostat dial being driven in a direction counter clockwise to lower the temperature setting.

9. The system of claim 1 which comprises:

a plurality of thermostats, each thermostat controlling the temperature in an associated zone;

the remote-control device comprising means to output a plurality of digital codes each selected to control the control circuit of each of the thermostats independently of and without interference in the control of the other thermostats.

* * * * *